United States Patent [19]
Nolette

[11] 3,774,202
[45] Nov. 20, 1973

[54] SQUINT-MODE SPATIAL FILTER
[75] Inventor: Jerry E. Nolette, Orange, Calif.
[73] Assignee: North American Rockwell Corporation, El Segundo, Calif.
[22] Filed: Feb. 10, 1967
[21] Appl. No.: 615,248

[52] U.S. Cl. ............................................ 343/5 CM
[51] Int. Cl. ............................................. G01s 9/02
[58] Field of Search ................................ 343/5 CM Primary Examiner—Malcolm F. Hubler
Attorney—William R. Lane, L. Lee Humphries and Rolf M. Pitts

[57] ABSTRACT

In a squint-mode radar data processor, spatial filtering provides spatial frequency resolution in azimuth corresponding to a uniform transverse lineal resolution. For a radar data matrix of range trace versus pulse repetition interval, the read-scan rate at which each range bin is scanned is increased as a direct function of range, whereby the fixed bandpass of an output filter represents a spatial frequency resolution which varies with range and corresponds to a fixed lineal resolution at all ranges.

11 Claims, 6 Drawing Figures

SQUINT-MODE SPATIAL FILTER

CROSS-REFERENCES TO RELATED APPLICATIONS

1. U.S. application Ser. No. 391,093 filed Aug. 18, 1964, now Pat. No. 3,408,647, by Forest J. Dynan et al., for AMTI Radar System.

2. U.S. application Ser. No. 389,299 filed Aug. 13, 1964, now Pat. No. 3,483,558 by Carl A. Wiley, for Radar Receiver Employing Synthetic Coherent Reference.

BACKGROUND OF THE INVENTION

In the utilization of airborne pulse energy systems, such as radar systems for ground mapping application, the desired image resolution sought is normally much better than that obtainable from the aperture of a physical antenna; good angular resolution requires large antenna apertures. Extremely large apertures, hundreds of times larger than that of an airborne physical antenna, have been synthesized by a side-looking radar system utilizing a straight line flight path of the utilizing vehicle. The received radar echoes for successive positions of the system along the flight path are stored and then combined to achieve the and radar image of interest, whereby the successive antenna positions corresponds to discrete antenna elements of an extended antenna array, as indicated for example at page 527 of "Introduction to Radar Systems" by Skolnik, published by McGraw-Hill (1962). Other discussions of synthetic arrays may be found in U.S. Pat. No. 3,178,711 issued Apr. 13, 1965, to R. O. Case, Jr., for High Resolution Scanning Radar and in U.S. Pat. No. 3,271,765 issued Sept. 6, 1966, to S. R. Pulford for Data Compression Processing System.

A principal requirement of the data processor for such synthetic array type systems involves means for adequately focussing the system for all target ranges of interest, whereby the improved resolution capabilities are more fully utilized. Such focussing problem arises relative to a selected point of interest commonly within the beamwidth of the antenna, for a plurality of successive positions of the antenna along a segment of the vehicle flight path corresponding to the synthetic aperture. For a side looking radar (physical directional antenna oriented substantially at right angles to the vehicle flight path vector), such focussing problem arises from the fact that the target echoes for given point of interest, at a given perpendicular distance from the vehicle flight line, travel slightly different slant ranges to the several system positions along the flight path. In other words, such echoes must be suitably coded or identified and then compensatorily delayed, prior to being combined for effecting a high resolution display signal.

Due to the nature of the overlap provided by successive pulsed lobes of energy, a larger overlap area occurs for larger ranges than at closer range distances from the platform velocity vector. Such variations in overlap give rise to various degrees of data smear, which increase with the length of the synthetic array (or total interrogation time interval), thereby imposing stringent platform motion compensation requirements for reasonable data correlation or target image registration over the interrogation interval. (Reducing the overlap area by reducing the length of the synthetic array, of course, provides lesser resolution, removing the advantage sought by means of the array.)

The above-noted U.S. Pat. No. 3,178,711 to Case teaches a monopulse technique for aligning the direction of the directivity of a synthetic array with the boresight direction of the physical antenna. Such technique involves adjusting the frequency of a local oscillator in accordance with the integral of the clutter angle-off-boresight indicated by the monopulse difference channel, whereby the narrow bandwidth of the IF strip is made to respond to that doppler-shifted portion of an IF signal representing clutter lying in the boresight direction of the physical antenna. The improved resolution obtained by such synthetic array, however, is an improved angular resolution which represents larger transverse linear extents at extended ranges. In other words, a uniform transverse lineal resolution is not provided.

A data processing system for a synthetic array comprising a side-looking radar is described in the above-noted U.S. Pat. No. 3,271,765 issued to Pulford. The processing arrangement of Pulford employs matched filter means means comprising a plurality of filter elements, each having an associated delay, whereby the combination of the filtered and delayed signals is a display signal representing an improved angular resolution. In order that a given plurality of Pulford's filter elements may be employed as a matched filter for all ranges of interest, the rate of read-out from the storage medium is adjusted as a direct function of range to provide maximum filter output. However, the use of a plurality of narrow bandpass filter elements representing discrete center frequencies provides limited data resolution. Also, such limited data resolution yet requires a substantial plurality of filter elements (and associated delay elements) in the matched filter means. In other words, a substantial amount of equipment is required in order to utilize only part of the data. The amount of required equipment increasing as the amount of stored data to be utilized is increased. Further, Pulford teaches only the use of a side-looking (90°) type system, and not a system for squint mode strip mapping use at other look-angles and providing a video output.

SUMMARY OF THE INVENTION

By means of the concept of the subject invention, the received spectrum of a stored ground-mapping range-trace signal is processed by a single fixed-bandpass element to conveniently provide rectangular mapping data strips of uniform registry, and the above-noted disadvantage of the prior art are avoided.

In a preferred embodiment of the invention, there is provided a video signal system having scan-converter storage means for providing a periodic output, successive portions of which include a frequency-multiplied spectral content of a corresponding successive sample of a sampled periodic video input to the scan converter, and a fixed band-pass filter responsive to the output of the scan converter. There is also provided menas cooperating with a read-scan mode of the scan converter for successively increasing the frequency-multiplication of the frequency-multiplied spectral output for successive portions of the sampled periodic video input. There is further provided frequency translating means interposed between the output of the scan converter storage means and an input of the single, fixed-bandpass filter for frequency-biasing the multiplied spectral content by a successively increasing amount for successive portions of the sampled video input.

By means of the above-described arrangement, the bandwidth of succeeding range-bin portions of a range trace signal is multiplied, while the center frequency of such bandwidth is restored or maintained at a common frequency, corresponding to the center frequency of the fixed bandpass filter to which the multiplied bandwidth signal is applied as an input. Thus, the fixed-bandpass, range-trace output of the filter corresponds to a lesser doppler spread or lesser beamwidth for increasing range, whereby a more nearly uniform transverse lineal resolution is provided at all ranges.

Because of the frequency multiplication and associated frequency-translating techniques utilized, a single fixed-bandpass filter may be employed, rather than the plurality of narrow-bandpass filter elements and associated delay elements of Pulford. Also, the concept of the invention may be utilized in any angularly squinted-ground mapping radar system, and does not relay on a side looking (90°) look-angle orientation. Accordingly, it is a broad object of the subject invention to provide an improved squint-mode ground mapping pulsed energy system.

It is another object of the invention to provide a squint-mode ground mapping pulsed energy system having improved resolution.

It is still another object to provide synthetic array means having a uniform transverse linear resolution at all ranges.

A further object of the invention is to provide a lineal extent spatial filter utilizing only a single, common, fixed-bandpass filter element at all range-bin portions of a doppler-processed range-trace signal.

A yet further object of the invention is to reduce the motion compensation requirements of a squint-mode, ground-mapping pulsed energy system.

These and other objects of the invention will become apparent from the following description, taken together with the accompanying drawings in which:

BRIEF DESCRIPTION OF THE DRAWINGS

In the figures, like elements refer to like parts.

DESCRIPTION OF THE PREFERRED EMBODIMENT

Figure 1:
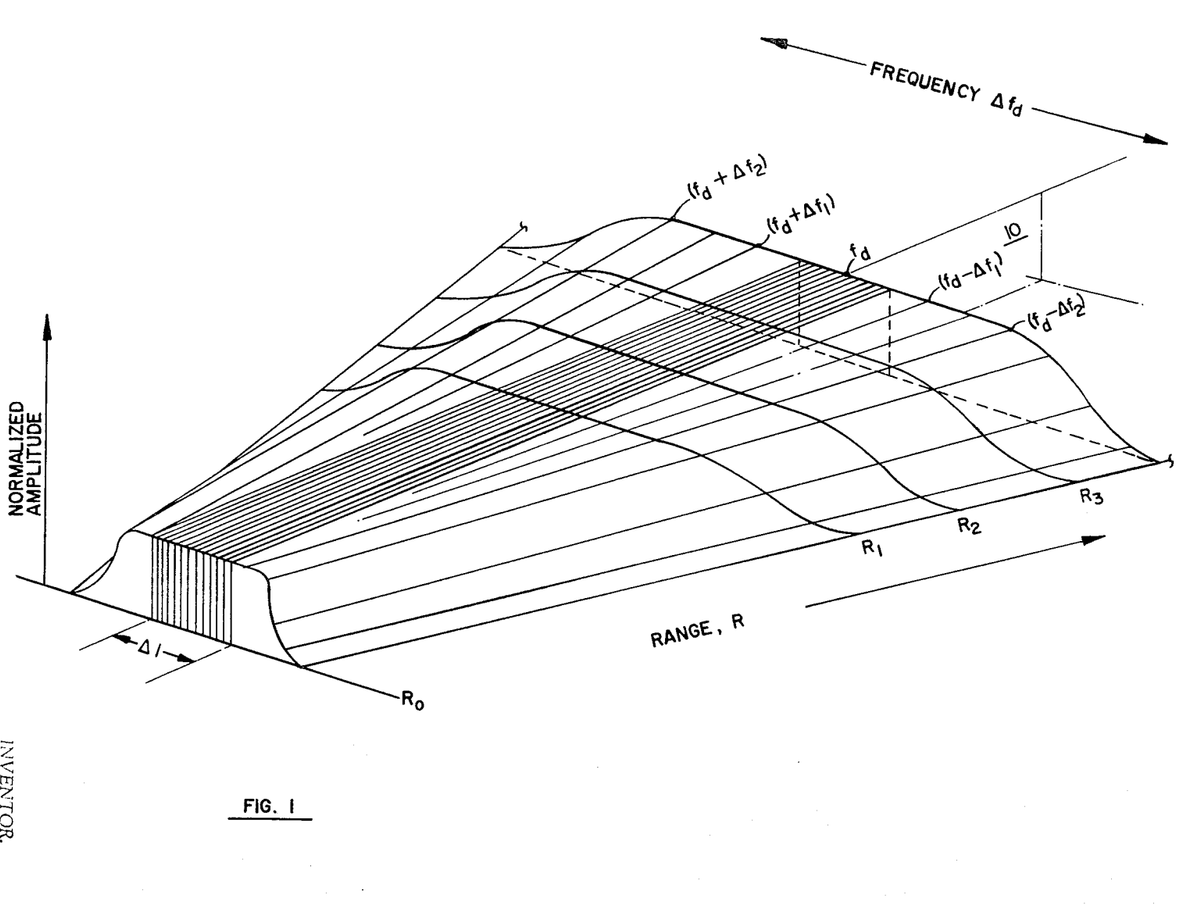
FIG. 1 is a diagram of the spectral distribution of the echoe return received by a squint-mode pulsed energy system for an exemplary angular beamwidth, and illustrating the comparative bandwidth effect of an azimuth resolution corresponding to a uniform transverse lineal extent.

Referring now to FIG. 1, there is illustrated a diagram of a representative spectral and spatial distribution of the echo return received from the terrain by an airborne (moving) squint-mode pulsed energy system having an exemplary angular beamwidth, and showing the bandwidth effect of an azimuth resolution corresponding to a uniform transverse lineal extent. Such spectral distribution is shown as a three-dimensional image of vertical planes arrayed horizontally in a radial array, the horizontal angle enclosing the array corresponding to the angular beamwidth of directional means for propagating the pulsed energy, vertical plane 10 corresponding to the center of the beamwidth. The orientation of the beamwidth center is presumed, for purposes of exposition of the inventive principle, to be angularly squinted in a horizontal plane, as to be in a direction somewhere between the flight line vector of the airborne platform upon which the system is mounted and a side-looking direction (e.g., 90° to the flight path vector). The height or vertical extent of each of the vertical planes is shown to be uniform as a function of range. In other words, the signal return from a particular direction in the beamwidth is presumed to be range-normalized, as to be uneffected by the distance of the component scatterer or element of terrain producing such component of the echo signal. The progressively lesser uniform height of the radial lines or planes at the limits or edges of the beamwidth correspond to the attenuation associated with echo returns from the beamwidth limits.

Because of the azimuthally squinted angular orientation $\theta$ of the beamcenter 10 of the antenna, relative to the velocity vector $\overline{V}_a$ of the platform upon which the pulse energy system is mounted, a doppler shift $V_a \cos \theta$ will be apparent in that component of the return echo received from the beam center 10. Also, because of the different angles associated with the component returns from other directions within the beamwidth, such off-beamcenter components will be doppler shifted relative to the frequency $f_d$ of the (doppler-shifted) return along beam-center 10 by an amount $\Delta f_i$ corresponding to each such angle or direction. In other words, the radial lines or planes within the illustrated beam pattern of FIG. 1 represent discrete frequencies $(f_d \mp \Delta f_i)$ within a doppler-shifted spectral distribution corresponding to discrete direction angles within the angular beamwidth of a directional sensor. Thus, a given frequency bandpass $\Delta f_d$ centered about the beam center frequency $f_d$ corresponds to a selected angular resolution.

Because a given bandwidth $\Delta f_d$ corresponds to a selected angular resolution, it is to be appreciated that the corresponding transverse lineal resolution limit, associated with such angular resolution, increases with range. Therefore, where a uniform transverse lineal resolution $\Delta l$ is desired, it is necessary to correspondingly reduce the bandwidth (to which the system responds) as a function of range, as shown by the transverse dimension $\Delta l$ centered about beam center 10 of FIG. 1. An alternate approach, employing a fixed bandwidth filter (corresponding to a preselected transverse lineal extent $\Delta l$) and multiplying the bandwidth of the received echoes as a discrete function of the range from which they occur, is shown in FIG. 2.

Figure 2:
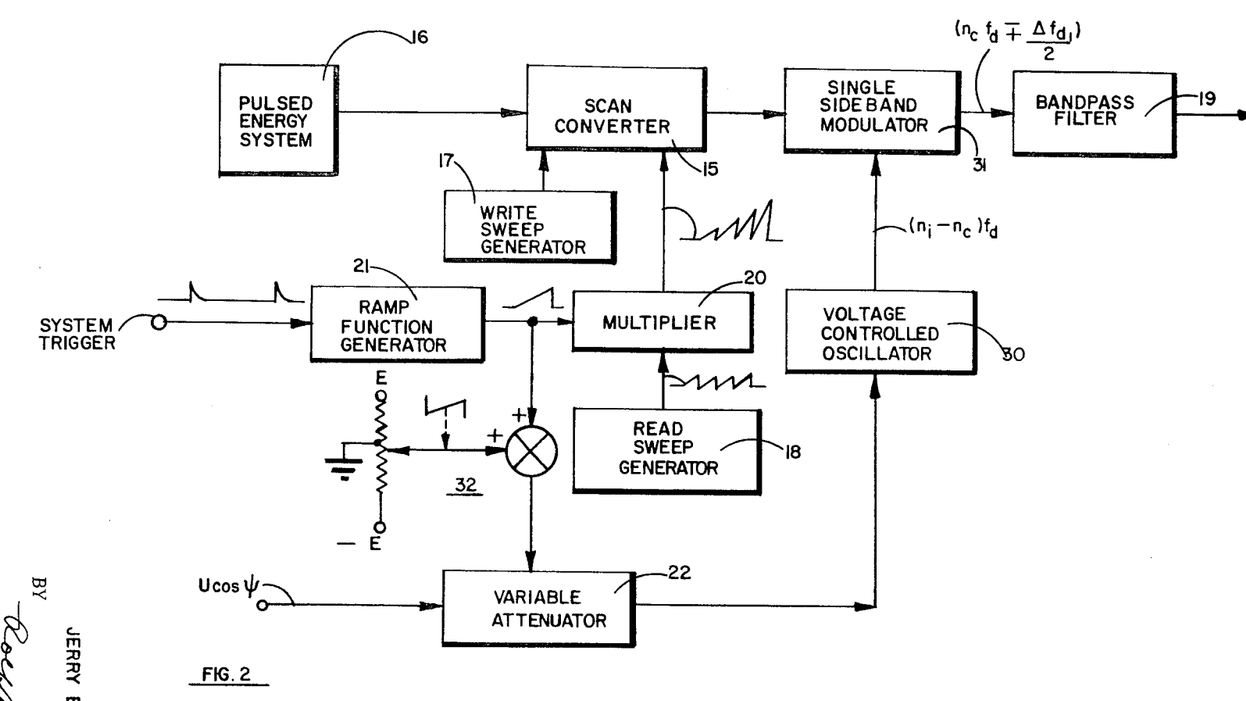
FIG. 2 is a block diagram of a system embodying the inventive concept.

Referring to FIG. 2, there is illustrated a block diagram of a system embodying the concept of the invention. There is provided scan-converter storage means comprising a scan-converter 15 responsively coupled to a video receiver output of a coherent pulsed energy system 16, and having a write-sweep generator 17 synchronized with a system trigger of the pulsed energy system for separately storing a preselected number of successive range trace signals. The scan converter storage means also includes a read-sweep generator 18 for sequentially scanning successive range bin portions of the stored range trace signals for recovering a frequency-multiplied spectral content of the video envelope at successive ones of the recorded range bin intervals. A fuller description of the organization and operation of suitable scan conversion storage means is provided in above noted U.S. application Ser. No. 391,093 filed Aug. 18, 1964, by Forest J. Dynan et al., assignors to North American Aviation, Inc., assignee of the subject invention. However, in the current invention, processing of successive batches of range trace signals may be preferred, rather than the add-one, drop-one technique described in such application. Coherent pulsed energy system 16 may be comprised of a coherent radar system for providing a clutter- referenced output of a type more fully described in above noted U.S. application Ser. No. 389,299 filed Aug. 13, 1964, by Carl A. Wiley, assignor to North American Aviation, assignee of the subject invention.

There is also provided in FIG. 2 a bandpass filter 19 having a fixed center frequency, the fixed bandpass $\Delta f_{do}$ of the filter corresponding to that associated with a preselected lineal transverse extent $\Delta l$ at an initial radar range $R_o$ in FIG. 1. There is further provided means cooperating with scan converter 15 and read-sweep generator 18 for effecting a successively increased frequency multiplication of the spectral content of the video envelope for successive range bin portions of the stored range trace signals; and comprising gain control means 20 interposed between the read-sweep input of scan converter tube 15 and the output of sweep generator 18 and having a control input responsive to a periodic ramp function generator 21 for multiplying the gain of the read-sweep input to scan converter 15 as a function of range time.

Figure 3:
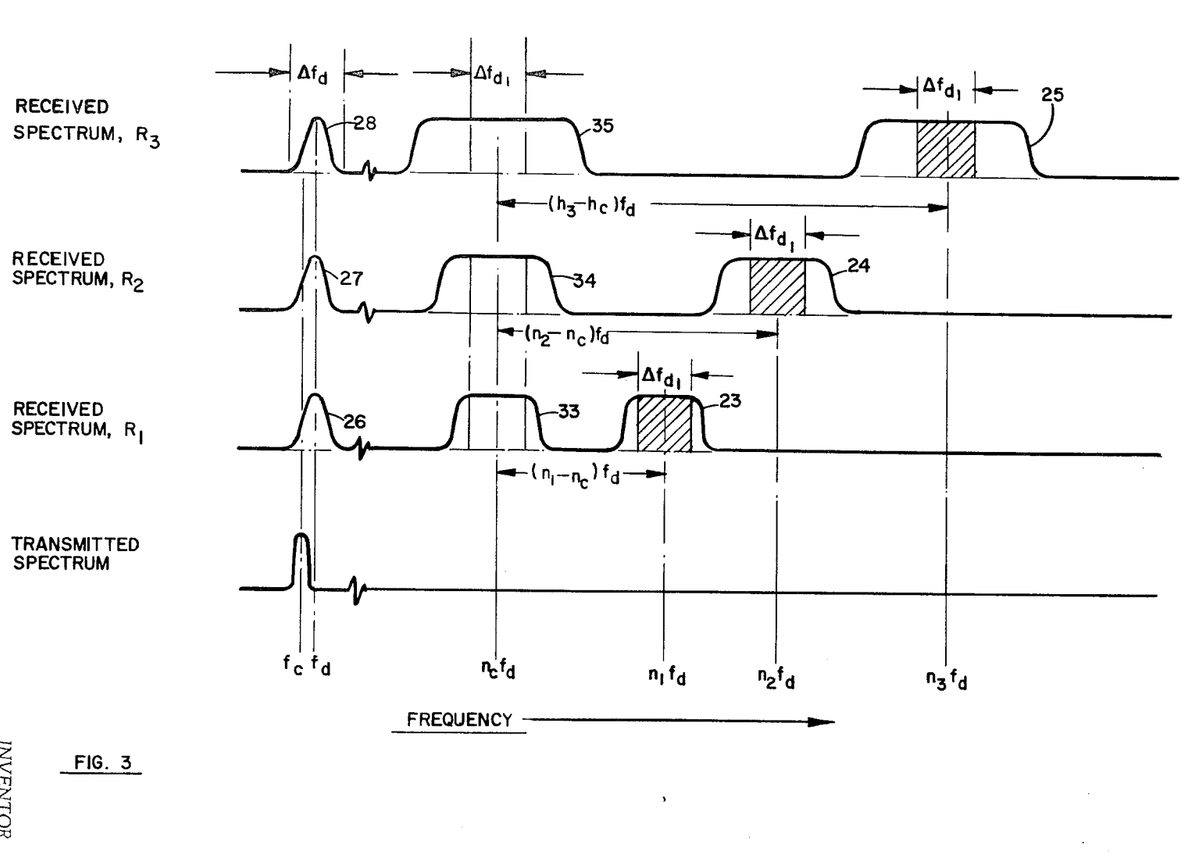
FIG. 3 is a family of spectral diagrams illustrating the exemplary response of the system of FIG. 2 to echo returns from different ranges.

By progressively increasing the gain of successive outputs of the read-sweep generator within a given range trace interval, the speed at which successive range bins or sampled portions of the range trace signal are read-swept results in a correspondingly-increased frequency multiplication of the spectral bandwidth of the video-envelope for successive ones of the sampled range bins, as shown by curves 23, 24 and 25 in FIG. 3, relative to the bandwidth $\Delta f_d$ of a received spectrum (curves 26, 27 and 28 of FIG. 3). The received spectrum, of course, represents a wider bandwidth than the transmitted spectrum due to the doppler spread associated with the antenna beamwidth and look-angle and the platform velocity, while the center $f_d$ of such received spectrum is doppler shifted relative to the transmitted carrier frequency $f_c$, as is well understood in the art. By means of the frequency multiplication effected by the cooperation of elements 15, 18, 20 and 21 in the illustrated arrangement of FIG. 2, a like corresponding bandwidth $\Delta f_d$, about the center frequency of each of the multiplied bandwidths 23, 24 and 25 of FIG. 3 represents progressively smaller portions of the video bandpass for successive range bins, corresponding to a uniform transverse lineal extent $\Delta l$ of the beamwidth of FIG. 1.

Associated with each of the frequency multiplied bandpass or range-sampled video spectra 23, 24 and 25 (of FIG. 3) is a correspondingly multiplied center frequency $n_1 f_d$, $n_2 f_d$, $n_3 f_3$, all of which are translated to a common frequency $n_c f_d$, representing the center frequency of spatial filter 19 of FIG. 2, by frequency translation means comprising a voltage controlled oscillator (VCO) 30 responsively coupled to the output of ramp function generator 21, and single sideband modulating means 31 interposed between the output of scan converter 15 and the input of spatial filter 19. Although the cooperation of ramp generator 21, VCO 30 and modulator 31 translate the frequency-multiplied video spectra to a common center frequency $n_c f_d$ (as shown by curves 33, 34 and 35 in FIG. 3), a source 32 of an adjustable bias signal may be desired in order to more conveniently adjust the common bandwidth center frequency $n_c f_d$ to the center frequency of filter 19. The bandpass limits $\Delta f_{d1}$ of filter 19 reject those portions of the frequency multiplied spectra 33, 34 and 35 representing returns from outside the beam center region of interest for each range. Hence, the fixed bandpass of filter 19 provides a spatially filtered range trace signal output indicative of a preselected uniform transverse radial extent, $\Delta l$.

The actual doppler shift of the echo return from the beam center of the azimuthally-squinted antenna beamwidth of the system of FIG. 2 is a function of the platform velocity U and of the azimuth look-angle $\psi$(measured relative to the velocity vector). As is well understood in the art, the doppler frequency $f_d$ of a ground target is given by the relationship:

$$f_d = 2U \cos \phi / \lambda,$$

where $\lambda$ = transmitted wavelength

Accordingly, means may be included in the arrangement of FIG. 2 for compensatorily varying the translation frequency $(n_f-n_c)f_d$ in response to variations in the factor $U \cos \phi$. Such means may be comprised of a gain-control circuit or attenuator 22 interposed between the biased output of generator 21 and the input of VCO 30 and having a control input responsively connected to a function generator or source (not shown) of the function $U \cos \phi$.

Figure 4:
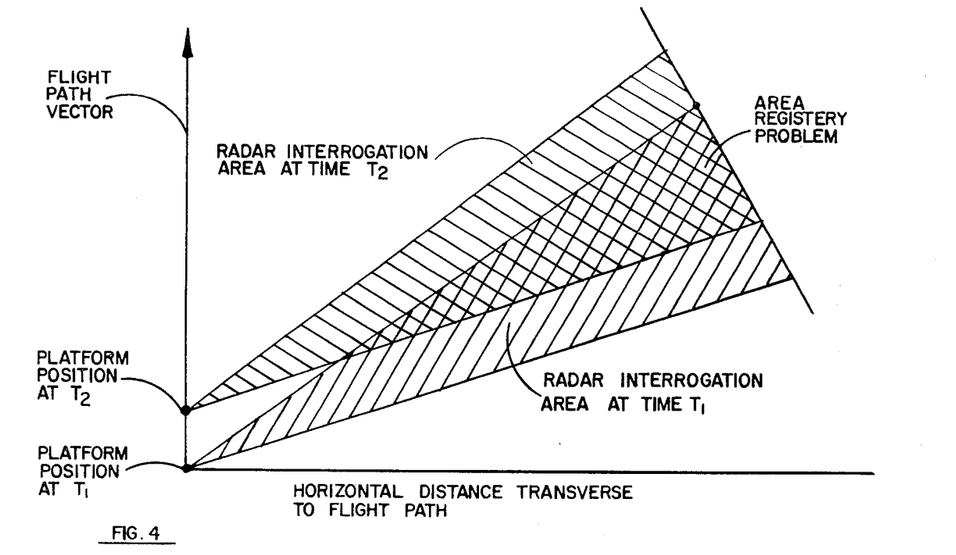
FIG. 4 is a diagram of the ground map of two successive antenna patterns of a synthetic array, showing the nature of the area registry problem solved by the concept of the invention.
Figure 5:
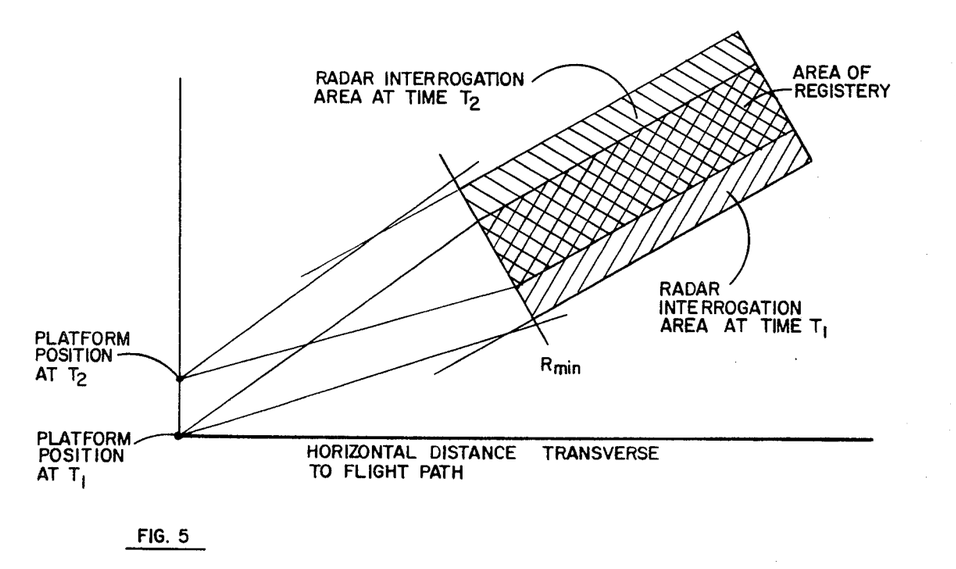
FIG. 5 is a diagram of the ground map of the response of the system of FIG. 2 to two successive antenna patterns of a synthetic area, showing the improved registry effected by means of the concept of the invention.

Che illustrated cooperation of spatial filter 19 (of FIG. 2) thus utilizes the data obtained from the first ($T_1$), last ($K_2$) and intermediate radar interrogations of a preselected number of radar interrogations made over an area under surveillance (as shown in FIG. 4), to provide a spatially filtered range trace output signal representing a uniform transverse lineal extent, as shown in FIG. 5 by the rectangular registry area corresponding to the overlap of the spatially filtered interrogation areas of the first and last interrogation intervals of a plurality of successive interrogation intervals occuring between the illustrated flight path position corresponding to the interval between times $T_1$ and $T_2$ in FIG. 5.

Figure 6:
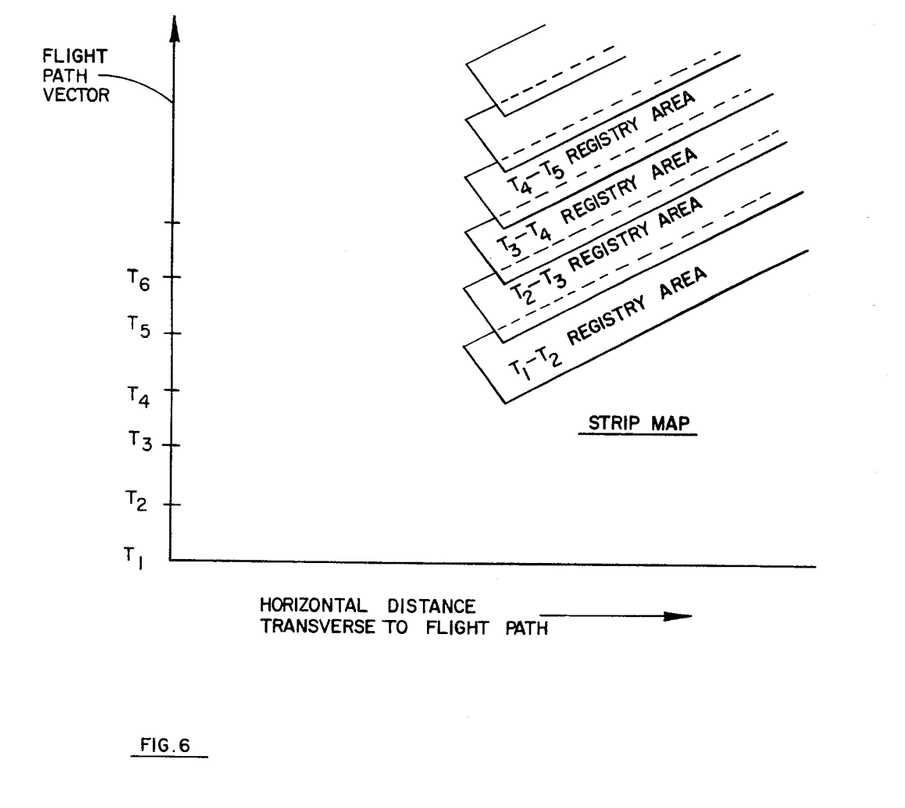
FIG. 6 is a diagram of a patch map formed by utilizing the improved strip resolution and registry provided by the inventive concept.

Such rectangular registry area data for a preselected number of successive contiguous (or slightly overlapping) strips may be employed by a second scan converter or other storage medium (not shown) on an add-one, drop-one basis (which basis is more fully described in above-noted application Ser. No. 391,093 filed Aug. 18, 1964) to provide an area map, as shown in FIG. 6. The squint-mode strip mapping technique, illustrated in FIG. 6, has several inherent advantages over a side-looking system (such as that of Pulford, infra) in that the system line of sight is less sensitive to flight path perturbations (in course and velocity). Also, at the usual squint angles employed, no registration ambiguities result; in other words, in the squint mode, a unique direction frequency is associated with each direction angle in azimuth, whereas in the side-looking situation, a given doppler shift may correspond to a direction either ahead of or behind the beam center. Further, the inherent look-ahead capability of the squint-mode system provides a measure of anticipation of an area under surveillance and forward of the moving platform, as to be useful in weapon delivery against a hostile territory.

Although compensation has been described for compensating the register center frequency $n_c f_d$ for doppler shift due to variations in azimuth squint angle $\phi$, none has been included for variations in elevation angle as a function of range. Although such further correction might be deemed desirable in certain cases, as a practical matter such further correction has been omitted where the vertical look-angle is very small relative to the horizontal look angle, and therefore, where changes in the vertical angle as a function of range are even smaller. Such a practical case for which the concept of the invention has been intended includes the following parameters:

Airspeed, $U = 500$ to $1,200$ feet per second
Altitude, $h = $ up to $15,000$ feet above the terrain
Range, $R = 9,000$ feet to 10 miles
Horizontal look-angle, $\phi = 30° - 60°$ Accordingly, there has been described spatial filtering means employing a single fixed bandpass filter for providing a uniform transverse lineal resolution at all ranges of interest in a pulsed energy system. Such improved spatial resolution has been demonstrated as being of especial utility in reducing registration problems in a squint-mode mapping radar system of the synthetic array type. Therefore, improved strip mapping means have been disclosed.

Although the spatial filtering concept of the invention has been described in terms of analog means for data matrix storage, frequency-multiplication frequency-translation and bandpass filtering, it is to be clearly understood that such analog means is exemplary only and the inventive concept is not so limited. Alternatively, digital techniques may be substituted wherein, for example, the function of frequency multiplication is effected by control or selective change of a digital clock rate.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a video signalling system having scan-converter storage means for providing a periodic output, successive portions of which include a frequency-multiplied spectral content of a corresponding successive sample of a sampled periodic video input to said scan converter means, and a fixed-bandpass filter responsive to the output of said scan converter means, the combination comprising means cooperating with a read-scan mode of said scan coverter means for successively increasing the frequency multiplication of said frequency-multiplied spectral output for successive portions of said sampled periodic video input; and frequency translating means interposed between said output of said scan converter means and an input of said filter for frequency-biasing said multiplied spectral content by a successively increasing amount for successive portions of said sampled video input.

2. In a video signalling system having scan converter storage means for providing a periodic output, successive portions of which include a frequency-multiplied spectral content of a corresponding successive sample of a sampled periodic video input to said scan converter, and a fixed-band pass filter, means for successively reducing the bandwidth of successive samples of said sampled video input to which said fixed bandpass filter responds, and comprising in combination means for successively increasing the frequency multiplication of said frequency-multiplied spectral content for successive portions of said sampled video input; and frequency translating means drivingly coupled to an input of said filter for translating the center frequency of said successively increased frequency-multiplied spectral content to a preselected frequency corresponding to a center frequency of said filter.

3. The device of claim 2 in which said scan converter storage means includes a read-sweep input and in which said means for successively increasing comprises means for progressively increasing the rate at which said successive portions of the sampled video input are read-swept by said scan converter.

4. The device of claim 2 in which said scan converter storage means includes a read-sweep input and in which said means for successively increasing comprises gain control means for multiplying the gain of said read-sweep input as a function of range-time.

5. The device of claim 2 in which said scan converter storage means includes a read-sweep input and in which said means for successively increasing comprises a ramp function generator having a periodicity equal to the periodicity of a read-scan output of said scan converter means; and a gain control circuit interposed at the read-sweep input of said scan converter storage means and having a gain control input responsively coupled to an output of said generator.

6. The device of claim 5 in which said frequency translating means is responsively coupled to the output of said ramp function generator.

7. The device of claim 5 in which said frequency means comprises a voltage controlled oscillator responsively coupled to an output of said ramp function generator; and single sideband modulating means interposed between the output of said scan converter storage means and said input of said filter and having a modulation input responsively coupled to an output of said voltage controlled oscillator.

8. In a pulsed energy system adapted for an airborne, squint-mode ground map application, means for providing a range-trace display signal indicative of a system resolution corresponding to a preselected lineal transverse extent and comprising frequency-multiplication means responsive to the video range-trace envelope of an output of said system for providing a successively increased frequency multiplication of the spectral content of said video envelope for successive portions of said range trace signal;

frequency translating means coupled to the output of said frequency-multiplied spectral content of said video envelope for frequency biasing of said frequency-multiplication means for translating a center frequency of said frequency multiplied spectral content to a preselected frequency; and a fixed-bandpass filter having a center frequency corresponding to said preselected frequency and a bandpass corresponding to said preselected lineal transverse extent.

9. In a pulsed energy ranging system adapted for an airborne squint-mode ground map application, spatial filter means for providing a system resolution corresponding to an energy lobe beamwidth having a uniform lineal transverse extent and comprising in combination scan converter storage means for storing a plurality of range trace signals and having a read-sweep input for range-sample read-sweeping corresponding range bin portions of said stored range trace signals;

a ramp function generator having a periodicity equal to that of a read-scan output of said scan converter means for increasing the rate of said read-sweep input as a function of sampled range;

a voltage-controlled-local oscillator having a control input responsively coupled to an output of said ramp-function generator;

means for selectively biasing said input of said voltage-controlled oscillator;

a bandpass filter responsively coupled to said read-scan output of said scan converter storage means; and single-side band modulating means interposed between said scan converter storage means and said band pass filter and having a modulating input coupled to an output of said voltage-controlled oscillator.

10. In combination, a pulsed energy system adapted for an airborne squint-mode groundmap application and having a video receiver output response; and means cooperating with said system for providing a system resolution corresponding to a preselected lineal transverse extent and comprising means for progressively limiting as a function of range-time that bandwidth of a received video envelope for which an output response is provided.

11. In a pulsed energy ranging system adapted for an airborne squint-mode ground map application, means for providing a system resolution corresponding to a preselected lineal transverse extent and comprising means for progressively limiting as a function of range time that bandwidth of a received video envelope for which an output response is provided, and including bandwidth multiplying means for progressively multiplying the bandwidth of said video envelope as a function of range-time; and fixed bandwidth means responsive to said progressively bandwidth multiplied video envelope.

* * * * *